United States Patent [19]

Fuchs et al.

[11] Patent Number: 4,639,315
[45] Date of Patent: Jan. 27, 1987

[54] APPARATUS FOR MECHANICAL PURIFICATION OF WASTE WATER

[75] Inventors: Ernst Fuchs, Schmerikon; Karl Fitzi, Hombrechtikon, both of Switzerland

[73] Assignee: Mecapec S.A., Schmerikon/SG, Switzerland

[21] Appl. No.: 787,620

[22] Filed: Oct. 15, 1985

[30] Foreign Application Priority Data

Oct. 18, 1984 [DE] Fed. Rep. of Germany ....... 3438170

[51] Int. Cl.$^4$ .................... B01D 23/24; B01D 29/38
[52] U.S. Cl. ............................ 210/333.1; 210/426; 210/427
[58] Field of Search .............. 210/324, 327, 329, 330, 210/331, 332, 333.01, 333.1, 346, 334, 359, 391, 393, 297, 402, 424, 425, 427, 411, 408, 426

[56] References Cited

U.S. PATENT DOCUMENTS 2,932,402  4/1960  Logue et al. .................. 210/391
4,090,965  5/1978  Fuchs ........................... 210/391

Primary Examiner—Frank Sever
Attorney, Agent, or Firm—Peter K. Kontler

[57] ABSTRACT

Apparatus for mechanical purification of waste water has a stationary hollow shaft which is installed in a vessel for waste water and carries a variable number of hollow drum-shaped frames with pairs of filters adjacent to the openings in their sidewalls. Waste water is drawn into the interior of the frames by a pump which is connected to one end of the shaft whereby the impurities deposit at the outer sides of the filters. Such impurities are removed from time to time by suction heads which are adjacent to the outer sides of the filters and are connected to a single sludge pump by discrete conduits, one for each frame. The inner sides of the respective filters are then sprayed by clean water which promotes segregation of impurities and their entry into the suction heads. Indexible valving elements are provided to connect conduits for admission of clean water into selected frames with a single source of clean water and to connect selected conduits for removal of impurities with the sludge pump.

17 Claims, 4 Drawing Figures

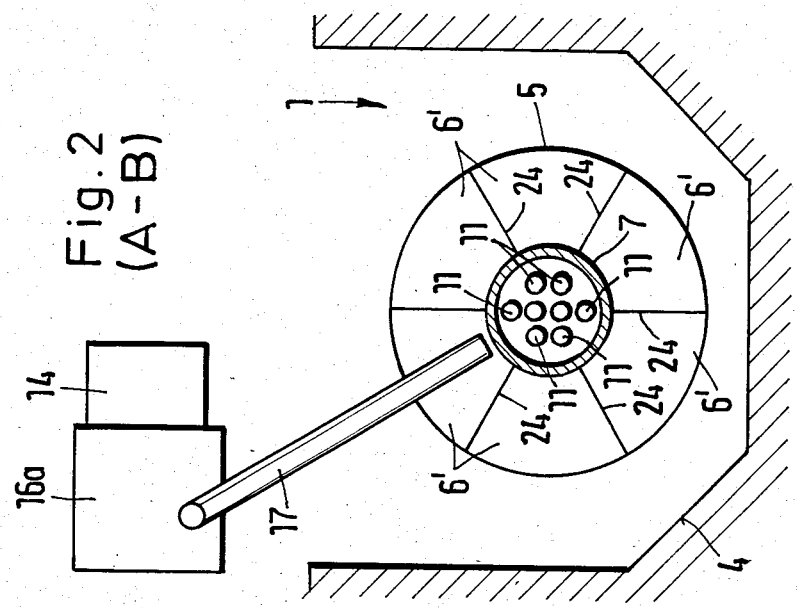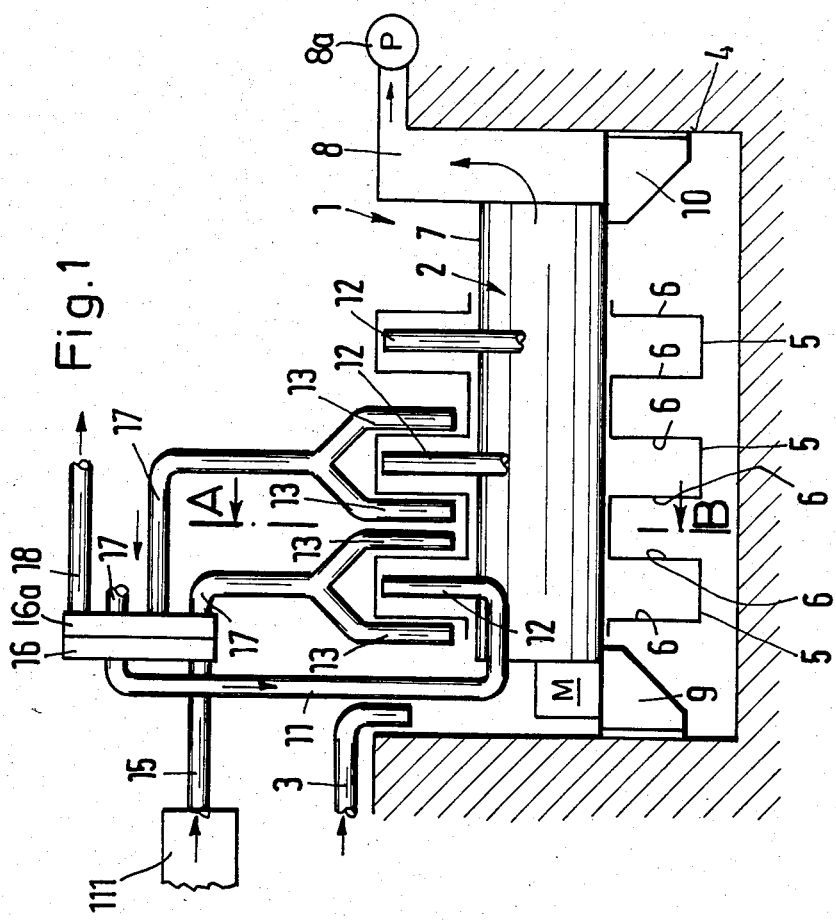

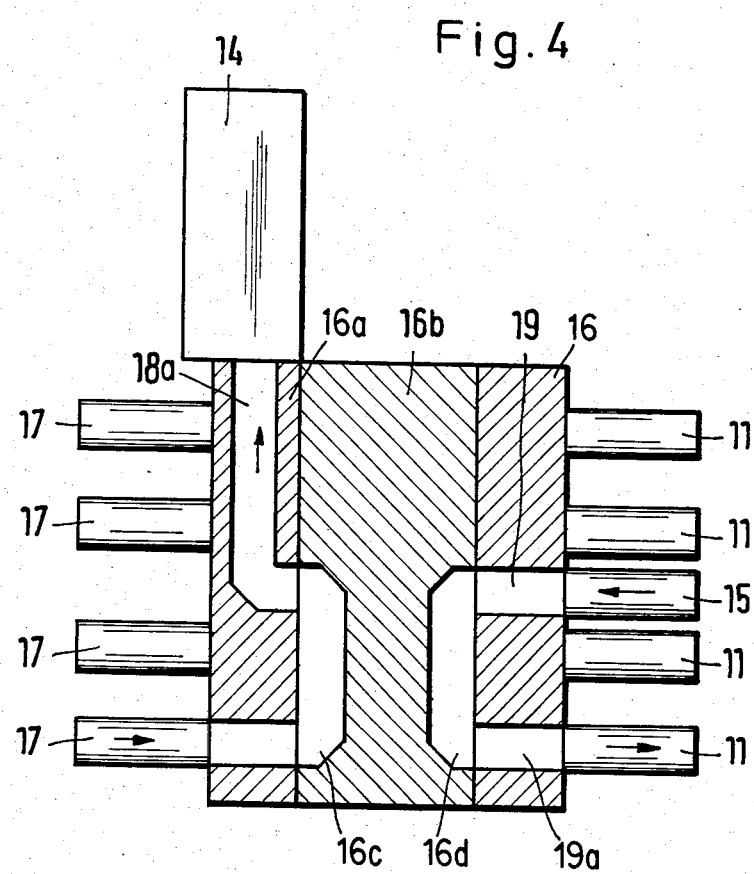

APPARATUS FOR MECHANICAL PURIFICATION OF WASTE WATER

CROSS-REFERENCE TO RELATED CASE

The apparatus of the present invention constitutes an improvement over and a further development of the apparatus which is disclosed in the commonly owned U.S. Pat. No. 4,090,965 granted May 23, 1978 for "Installation for the mechanical-biological purification of waste water".

BACKGROUND OF THE INVENTION

The present invention relates to apparatus for mechanical purification of waste water, especially for mechanical purification of biologically purified waste water.

It is already known to provide an apparatus for mechanical purification of waste water with one or more hollow-drum-shaped rotary frames for filters which permit water to flow into the interior of the frames but intercept the impurities so that each filter gradually accumulates a layer of intercepted contaminants and its filtering action deteriorates accordingly. It is also known to clean such filters at required intervals by streams of clean water which are directed against the inner sides of the filters and cause the separated contaminants to enter the inlets of suction heads. Reference may be had to U.S. Pat. No. 4,090,965.

The versatility of the apparatus which is disclosed in the German patent is insufficient, mainly because the cleaning action is unsatisfactory so that the permeability of the filters deviates from an optimum permeability. Attempts to intensify the cleaning action include the provision of means for spraying clean water against the inner sides of the filters and the provision of pumps which remove water from the outer sides of the filters in the course of the spraying operation. Such apparatus are bulky, complex and expensive. Moreover, the energy requirements of conventional apparatus are high and their capacity is small.

OBJECTS AND SUMMARY OF THE INVENTION

An object of the invention is to provide a novel and improved apparatus for mechanical purification of waste water which is constructed and assembled in such a way that its filter or filters can be used for longer intervals of time than in heretofore known apparatus and wherein the segregation of contaminants from the filter or filters is effected with simple, compact and inexpensive devices.

Another object of the invention is to provide the apparatus with novel and improved means for separating impurities from the outer side or sides of one or more filters.

A further object of the invention is to provide the apparatus with novel and improved means for segregating impurities only from that filter or from those filters whose permeability has been reduced below a preselected minimum acceptable value.

An additional object of the invention is to provide novel and improved means for selectively activating the impurities-collecting means for certain filters of the above outlined apparatus.

Still another object of the invention is to provide novel and improved filter supporting frames for use in the above outlined apparatus.

Another object of the invention is to provide novel and improved filters for use in conjunction with the frame or frames of the above outlined apparatus.

A further object of the invention is to provide a novel and improved method of segregating solid and other impurities from filters in apparatus for mechanical purification of waste water with one or more drum-shaped rotary filtering units.

An additional object of the invention is to provide an apparatus whose energy requirements are low and wherein the mass of moving parts is small but which is capable, nevertheless, of removing impurities from large quantities of waste water per unit of time.

One feature of the invention resides in the provision of an apparatus for mechanical purification of waste water, particularly for mechanical purification of waste water which has undergone or is about to be subjected to a biological purification. The improved apparatus comprises a vessel (e.g., a basin or tank in the ground) for a supply of waste water, a hollow support (such as a horizontal shaft), at least one hollow drum-shaped frame which is rotatably mounted on and surrounds the support and has at least one opening a portion of which at least is immersed into waste water in the vessel during each revolution of the frame about the support, filter means including a foraminous filter which is mounted on the frame, whose inner side overlies the opening in the frame and whose outer side intercepts impurities which are contained in waste water flowing into the frame by way of the opening when the filter dips into the supply of waste water in the vessel, means for withdrawing the thus mechanically purified water from the interior of the frame (such withdrawing means preferably includes a portion of the support and can further include one or more pumps which draw purified water from the portion of the support), a source of clean water (such source can receive clean water which has passed through the filter and was evacuated from the interior of the frame), a feeding device which is operable to supply clean water from the source into the interior of the frame and has a portion (e.g., the discharge end of a conduit) which serves to direct clean water against the inner side of the filter when the permeability of the filter decreases below a minimum acceptable value, and suction generating means a portion of which is adjacent to the outer side of the filter opposite the aforementioned portion of the feeding device and is actuatable (e.g., by starting a suction pump which forms part of or is combined with the suction generating means) to collect impurities which are expelled or segregated from the filter by clean water in response to operation of the feeding device.

The arrangement is preferably such that the drum-shaped frame has an opening in each of its radially extending sidewalls, and the filter means then comprises two filters each of which overlies one of the two openings. The aforementioned portion of the feeding device then preferably comprises means for supplying clean water to the inner sides of both filters (such supplying means can include several rows of orifices), and the suction generating means then comprises two suction heads each adjacent to the outer side of a different filter.

The apparatus preferably further comprises one or more additional frames which are rotatably mounted on the support so as to form a battery of two, three or more coaxial frames, additional filter means for each additional frame, an additional feeding device for each additional frame (all such feeding devices can receive clean water from a common source), and additional suction generating means for each additional frame.

Each feeding device preferably comprises at least one stationary conduit which extends through the support and into the interior of the respective frame. Furthermore, each filter can comprise a plurality of neighboring wedge-shaped sectors surrounding the support. Each frame then preferably comprises grooves for portions of sectors forming part of the respective filter or filters (such grooves can be adjacent to the periphery of the support for the frames), and the apparatus then preferably further comprises clamping elements (such clamping elements can be installed adjacent to the peripheral surface of each frame) which releasably hold the sectors on the frame. The sectors of each filter together constitute a disc and the frames are preferably provided with substantially radially extending spokes which alternate with the sectors of the respective filters and can be separably connected with the adjacent portions of the sectors.

If the apparatus comprises two or more frames, it is preferably further provided with means for selectively connecting the feeding devices with the source of clean water, i.e., the operator of the plant including the improved apparatus can decide to clean the filters of two or more frames in accordance with a predetermined pattern or whenever the need arises (namely when the filter or filters on a particular frame are clogged so that their permeability is unsatisfactory). Analogously, the apparatus which comprises two or more frames can be provided with means for selectively activating the suction generating means in a predetermined sequence or whenever the need arises, i.e., whenever the associated feeding device is operated to direct one or more jets or sprays of clean water against the inner side of the corresponding filter.

Each feeding device can comprise a conduit whose discharge end constitutes or communicates with the aforementioned portion of the respective feeding device and whose intake end is connectable with the source of clean water by a valving element which is movable between a plurality of different positions in each of which the source is connected with the intake end of a different conduit. The valving element is preferably indexible about a predetermined axis. The suction generating devices of such apparatus can comprise discrete conduits whose intake ends are adjacent to the outer sides of the respective filters and whose discharge ends are connectable with a suction pump or a like evacuating device by way of a second valving element, e.g., a valving element which is indexible about the aforementioned axis.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic longitudinal vertical sectional view of an apparatus which embodies the invention;

FIG. 2 is a transverse vertical sectional view as seen in the direction of arrows from the line A-B of FIG. 1;

FIG. 4 is an enlarged sectional view of a valve in the apparatus of FIG. 1.

DESCRIPTION OF THE PREFERRED EMBODIMENTS

Figure 3:
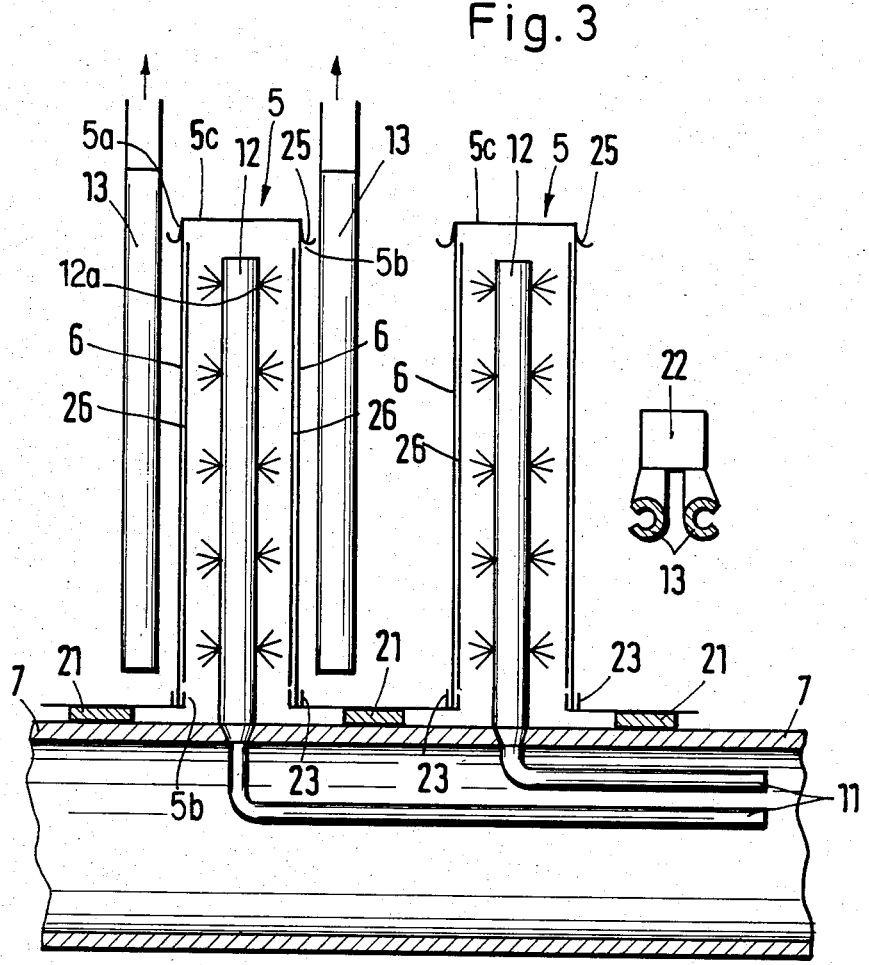
FIG. 3 is an enlarged view of a detail in the apparatus of FIG. 1.

Referring first to FIGS. 1 and 2, there is shown an apparatus 1 for mechanical purification of waste water. The apparatus includes a vessel 4 which can constitute a basin in the ground or a tank which is recessed into the ground. As a rule, waste water which is supplied into the vessel 4 by one or more pipes 3 has undergone biological purification preparatory to mechanical purification in the improved apparatus. The latter further comprises a hollow support 7 which is a horizontal shaft fixedly mounted on the sidewalls of the vessel 4 and serving as a means for carrying a set 2 of coaxial hollow drum-shaped or disc-shaped frames 5. Each frame 5 has a cylindrical or substantially cylindrical peripheral wall 5c and two radially extending walls 5a provided with openings 5b which are inwardly adjacent to discrete disc-shaped foraminous filters 6. A portion of each opening 5b dips into the body of waste water in the vessel 4 in each angular position of the respective frame 5. The liquid fraction of waste water in the vessel 4 flows through the filters 6, into the interior of the respective frames 5 and thence into the interior of the support 7. A portion of this support forms part of the means for withdrawing cleaned water from the frames 5, and such withdrawing means further comprises a pipe 8 which communicates with one end of the support 7 and with the suction inlet of a suitable pump 8a.

In contrast to heretofore known apparatus for mechanical purification of waste water, the filters 6 and their frames 5 are rotatable about the stationary support 7 whose end portions rest on two brackets 9 and 10 in the interior of the vessel 4. The means for rotating the frames 5 (preferably as a unit) includes an electric motor M or any other suitable prime mover. Prime movers (e.g., turbines) of the type disclosed in the aforementioned U.S. Pat. No. 4,090,965 can also be used to rotate the frames 5 and their filters 6 relative to the stationary support 7. An advantage of the improved apparatus is that the combined mass of rotating parts is relatively small because the support 7 need not share the angular movements of the frames 5 and their filters 6. Therefore, the vessel 4 can accommodate a large number of frames 5, each with preferably two filters 6, and such frames can be rotated by a relatively small prime mover M. The length of the vessel 4 (as considered in the direction of the common axis of the frames 5) and the number of filters 6 and frames 5 will be selected in dependency on the desired capacity of the purifying apparatus i.e., on the quantity of waste water which is supplied by the pipe or pipes 3 per unit of time. The combined area of the filters 6 should suffice to ensure a satisfactory mechanical purification when the vessel 4 receives waste water at a maximum rate.

The means for periodically cleaning the filters 6, i.e., for periodically removing layers or crusts of impurities which accumulate at the outer sides of the filters, includes a discrete clean water feeding device for each of the frames 5. Each feeding device includes a conduit 11 which is stationary and a portion 12 of which extends into the interior of the respective frame 5 (see particularly FIG. 3). The portion 12 constitutes the discharge end of the respective conduit 11 and is provided with orifices 12a serving to discharge sprays or jets of clean water against the inner sides of the filters 6 which are supported by the respective frame 5. For example, the portion 12 of each conduit 11 can be provided with two rows of orifices 12a; one row discharges sprays of clean water against the inner side of the right-hand filter 6 and the other row discharges sprays of clean water against the inner side of the left-hand filter 6 on the corresponding frame 5. The conduits 11 and their portions 12 are stationary and each thereof can be secured to and carried by the support 7. As a frame 5 rotates, the corresponding conduit 11 directs sprays of clean water against successive portions of the inner sides of the respective filters 6 to thus ensure rapid and complete removal of layers of contaminants from the outer sides of such filters. The intake ends of the conduits 11 are connectable to a common source 111 of clean water. Such source can receive clean water from the pump 8a. An indexible valving element 16 is provided to connect the intake end of a selected conduit 11 to the source 111 wherein the supply of clean water is maintained at a requisite pressure (or the source 111 is located at a level well above the frames 5) to ensure that sprays issuing from the orifices 12a are discharged at a pressure which is sufficient to separate the accumulations of impurities from the outer sides of the corresponding filters 6.

FIG. 1 shows a single conduit 11 for the sake of simplicity. FIG. 2 shows a total of eight conduits 11, for example, two for each of the frames 5 (only three frames are actually shown in FIG. 1). FIG. 3 shows one conduit 11 for each of the frames 5. If each feeding device comprises two or more stationary conduits 11, the portions 12 of such conduits are spaced apart from one another, as considered in the circumferential direction of the support 7, so as to ensure that successive portions of each filter 6 will be acted upon by several rows of sprays of clean water during each revolution of the respective frame.

The impurities which are separated from the outer sides of the filters 6 could be permitted to accumulate in the vessel 4. However, it is preferred to prevent the gathering of impurities in the vessel 4 around the frames 5 and, therefore, the improved apparatus further comprises suction generating means for evacuating the impurities as soon as they are segregated from the respective filters 6. The evacuating means comprises a sludge pump 14, a valving element 16a which is preferably adjacent to the valving element 16, and a discrete conduit 17 for each of the frames 5. The valving element 16a is indexible about the axis of the valving element 16 in order to connect the discharge end of a selected conduit 17 with the pump 14. The intake ends of the conduits 17 constitute pairs of suction heads 13 which are outwardly adjacent to the filters 6 on the respective frames 5. The reference character 18 denotes a conduit which receives impurities from the housing 16b of the valving element 16a to deliver impurities to the pump 14 when the latter is on. A conduit 15 connects the housing (16b) for the valving element 16 with the outlet of the source 111, and the valving element 16 admits clean water into the intake end of the selected conduit 11 in response to indexing about the horizontal axis which is common to the valving elements 16 and 16a. The valving elements 16 and 16a can be indexed jointly by hand or by remote control in a manner not forming part of the present invention.

An advantage of the valving element 16 is that a single source 111 can supply clean water to any one of the conduits 11 and that the source 111 need not store a large quantity of clean water because pairs of filters 6 are cleaned one after the other rather than simultaneously. While it is also within the purview of the invention to simultaneously clean all of the filters or to simultaneously clean the filters of two or more (but not all) frames 5, the cleaning of pairs of filters one after the other is preferred at this time because it contributes to simplicity, compactness and lower cost of the apparatus.

The feature that the valving element 16a connects individual conduits 17 to the pump 14 also contributes to simplicity, compactness and lower cost of the improved apparatus. Thus, a relatively small pump 14 suffices to withdraw the segregated impurities from all of the filters 6, not simultaneously but rather from one pair after the other. Furthermore, such apparatus can operate properly with small-diameter conduits 15 and 18. The valving elements 16 and 16a, with their common housing 16b, are shown in FIG. 4 which further shows a radially extending channel 18a provided in the valving element 16a to connect the conduit 18 (not shown in FIG. 4) with the intake end of a selected conduit 17 by way of one of several channels 16c in the housing 16b. The valving element 16 has a pair of spaced-apart axially extending bores 19 and 19a which can connect the conduit 15 with the intake end of a selected conduit 11 by way of one of several channels 16d in the housing 16b. The valving elements 16, 16a are indexed as a unit to thus ensure that admission of clean water into the interior of a selected frame 5 invariably entails connection of the corresponding conduit 17 with the inlet of the pump 14.

The operators can select those conduits 11 and 17 which are to be connected with the source 111 and pump 14, respectively, depending on the extent of contamination or clogging of the corresponding pairs of filters 6. Means can be provided to monitor the rate of flow of cleaned water through the pairs of filters 6 on the frames 5 and to automatically index the valving elements 16 and 16a to proper positions for immediate removal of impurities from filters 6 whose permeability has been reduced below an acceptable value.

FIG. 3 shows that the innermost portions of the walls 5b of each frame 5 are formed with pockets 23 defining grooves for the radially innermost portions of the respective filters 6. The radially outermost portions of the filters 6 are held on to the adjacent portions of the respective walls by suitable clamping devices 25 to prevent leakage of waste water around the outer marginal portions of the filters. The hubs of the frames 5 are rotatably mounted on friction bearings or liners 21 which are mounted on and surround the support 7. Each filter 6 preferably comprises a number (e.g., six) of sector- or wedge-shaped portions 6' (see FIG. 2) and neighboring portions or sectors 6' of each filter 6 are separated from each other and are secured to radially extending spokes 24 of the respective frame 5.

FIG. 3 further shows a stationary carrier 22 for the suction heads 13 of a pipe 17 which is adjacent to the right-hand frame 5. The suction heads 13 on the carrier 22 are angularly offset with reference to the suction heads 13 for the adjacent frame 5. This renders it possible to place the frames 5 nearer to each other, i.e., to mount a large number of frames on a relatively short support 7. For example, pairs of suction heads 13 for neighboring frames 5 can be angularly offset by 90 degrees.

The sectors 6' of the filters 6 can be made of a textile material, or of perforated or foraminous synthetic plastic material, or of a combination of two or more different materials. In order to prevent excessive deformation of the sectors 6', the frames 5 preferably carry pairs of perforated disc-shaped back supports 26 which are adjacent to the inner sides of the respective filters 6 and can be connected with or can include the respective sets of spokes 24.

In addition to simplicity, reasonable cost and compactness, the improved apparatus exhibits the advantage that it can be operated without interruptions and with a minimum of maintenance for long periods of time. This is attributed to the fact that the filters 6 on selected frames 5 can be cleaned independently of other filters and at desired intervals so that the cleaning of a pair of filters can take place while the other pairs of filters are in use, i.e., while the apparatus continues to remove impurities from waste water which flows into the remaining frames 5. Moreover, and since the means for generating suction at the outer sides of the filters 6 occupies little room, a large number of frames 5 can be mounted close to each other to thus increase the capacity of the apparatus and to ensure reliable segregation of impurities from water which is drawn by the pump 8a.

A further important advantage of the improved apparatus is that it is ideally suited for assembly from a number of modules. Thus, and since the support 7 is stationary, the apparatus can be provided with any desired practical number of modules each including a frame 5 and a pair of filters 6 thereon. In other words, the capacity of the improved apparatus can be varied within a wide range by the simple expedient of changing the number of frames 5 on the support 7.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for mechanical purification of waste water, particularly of water which has undergone a biological purification, comprising a vessel for a supply of waste water; a hollow support; at least one hollow drum-shaped frame rotatably mounted on and surrounding said support, said frame having at least one opening at least a portion of which is immersed into waste water in said vessel during each revolution of said frame about said support; filter means including a foraminous filter mounted in said frame and having an inner side overlying said opening and an outer side which intercepts impurities contained in waste water entering said frame by way of said filter and said opening; means for withdrawing the thus purified water from the interior of said frame; a source of clean water; a feeding device operable to supply clean water from said source into the interior of said frame and having a stationary portion arranged to direct clean water against successive portions of the inner side of said filter as the filter rotates with said frame around said support; and suction generating means including a portion adjacent to the outer side of said filter opposite said portion of said feeding device and actuatable to collect impurities which are expelled from the filter by clean water in response to operation of said feeding device, said portion of said feeding device cooperating with said portion of said suction generating means to maintain the permeability of said filter above a preselected minimum acceptable value for extended intervals of time.

2. The apparatus of claim 1, wherein said frame has a peripheral wall and two sidewalls each of which has an opening, said filter means comprising two foraminous filters which are adjacent to the sidewalls of said frame, said portion of said feeding device having means for supplying clean water to the inner sides of both said filters and said portion of said suction generating means having two suction heads each adjacent to the outer side of a different one of said filters.

3. The apparatus of claim 1, further comprising at least one additional frame rotatably mounted on said support, additional filter means for said additional frame, an additional feeding device for said additional filter means, and additional suction generating means for said additional feeding device.

4. The apparatus of claim 1, wherein said feeding device comprises a stationary conduit which extends through said support and into the interior of said frame.

5. The apparatus of claim 1, wherein said filter includes a plurality of neighboring sectors surrounding said support.

6. The apparatus of claim 5, wherein said frame has grooves for portions of said sectors and further comprising clamping elements for releasably holding the sectors on said frame.

7. The apparatus of claim 6, wherein said sectors together constitute a disc and said frame includes substantially radially extending spokes alternating with and supporting portions of said sectors.

8. The apparatus of claim 1, further comprising at least one additional frame rotatably mounted on said support, additional filter means provided on said additional frame, an additional feeding device having a portion in said additional frame, additional suction generating means for said additional feeding device, and means for selectively connecting said feeding devices with said source.

9. The apparatus of claim 8, wherein said feeding devices include conduits having intake ends and discharge ends including said portions of the respective feeding devices and located in the respective frames, said connecting means comprising a valving element movable between a plurality of positions in one of which said source admits clean water to the intake end of one of said conduits and in another of which said source admits water to the intake end of the other of said conduits.

10. The apparatus of claim 9, wherein said valving element is indexible between said positions about a predetermined axis.

11. The apparatus of claim 1, further comprising at least one additional frame rotatably mounted on said support, additional filter means provided on said additional frame, an additional feeding device having a portion in said additional frame and connectable to said source, additional suction generating means for said additional feeding device, each of said suction generating means including a conduit having an intake end adjacent to the filter of the respective filter means and constituting said portion of the respective suction generating means and a discharge end, and further comprising means for evacuating impurities from the discharge ends of said conduits and means for selectively connecting said evacuating means with the discharge ends of said conduits.

12. The apparatus of claim 11, wherein said connecting means comprises a valving element which is movable between a first position in which said evacuating means draws impurities from the discharge end of one of said conduits and a second position in which said evacuating means draws impurities from the discharge end of the other of said conduits.

13. The apparatus of claim 12, wherein said valving element is indexible about a predetermined axis.

14. The apparatus of claim 13, wherein each of said feeding devices comprises a further conduit having an intake end and a discharge end including said portion of the respective feeding device and disposed in the interior of the respective frame, and further comprising means for selectively connecting the intake ends of said further conduits with said source including a second valving element indexible about said axis between a first position in which said source is connected with the intake end of one of said further conduits and a second position in which said source is connected with the intake end of the other of said further conduits.

15. The apparatus of claim 1, wherein said frame is rotatable about a substantially horizontal axis.

16. The apparatus of claim 1, wherein said withdrawing means includes a portion of said support.

17. The apparatus of claim 1, wherein said portion of said feeding device has a plurality of orifices arranged to spray clean water against the inner side of said filter.

* * * * *